(12) United States Patent
Yamada et al.

(10) Patent No.: US 7,367,202 B2
(45) Date of Patent: May 6, 2008

(54) REFRIGERANT CYCLE DEVICE WITH EJECTOR (75) Inventors: Etsuhisa Yamada, Kariya (JP);
Hirotsugu Takeuchi, Nagoya (JP);
Haruyuki Nishijima, Obu (JP)

(73) Assignee: Denso Corporation, Kariya (JP)

( * ) Notice: Subject to any disclaimer, the term of this patent is extended or adjusted under 35 U.S.C. 154(b) by 87 days.

(21) Appl. No.: 11/503,892

(22) Filed: Aug. 14, 2006

(65) Prior Publication Data
US 2007/0039349 A1    Feb. 22, 2007

(30) Foreign Application Priority Data
Aug. 17, 2005   (JP)   ............... 2005-236659

(51) Int. Cl.
*F25B 1/06* (2006.01)
(52) U.S. Cl. .................. 62/500; 62/170; 62/191
(58) Field of Classification Search ............ 62/123, 62/170, 191, 500, 512, 513
See application file for complete search history.

(56) References Cited

U.S. PATENT DOCUMENTS

| 5,343,711 | A | * | 9/1994 | Kornhauser et al. | .......... 62/116 |
|---|---|---|---|---|---|
| 6,477,857 | B2 | | 11/2002 | Takeuchi et al. | |
| 6,574,987 | B2 | | 6/2003 | Takeuchi et al. | |
| 6,729,149 | B2 | | 5/2004 | Takeuchi | |

FOREIGN PATENT DOCUMENTS

| JP | 03-005674 | 1/1991 |
|---|---|---|
| JP | 2004-257694 | 9/2004 |

OTHER PUBLICATIONS

U.S. Appl. No. 11/393,037, filed Mar. 30, 2006, Saito et al.

* cited by examiner

*Primary Examiner*—Melvin Jones
(74) *Attorney, Agent, or Firm*—Harness, Dickey & Pierce, PLC (57) ABSTRACT A refrigerant cycle device includes a compressor for compressing refrigerant, a condenser for cooling and condensing high-pressure refrigerant discharged from the compressor, a vapor-liquid separator located at a refrigerant outlet side of the condenser for separating refrigerant from the condenser into vapor refrigerant and liquid refrigerant, a supercooling device for supercooling the liquid refrigerant from the vapor-liquid separator, an ejector having a nozzle part for decompressing refrigerant downstream from a refrigerant outlet side of the condenser and a refrigerant suction port for drawing refrigerant by a high-velocity flow of refrigerant jetted from the nozzle part, a throttle member which decompresses the liquid refrigerant supercooled by the supercooling device, an evaporator located at a downstream side of the throttle member and is connected to the refrigerant suction port of the ejector. Accordingly, cooling capacity of the evaporator can be improved without lowering a density of refrigerant drawn into the compressor.

14 Claims, 5 Drawing Sheets

REFRIGERANT CYCLE DEVICE WITH EJECTOR

CROSS REFERENCE TO RELATED APPLICATION

This application is based on Japanese Patent Application No. 2005-236659 filed on Aug. 17, 2005, the contents of which are incorporated herein by reference in its entirety.

BACKGROUND OF THE INVENTION

1. Field of the Invention

The present invention relates to a refrigeration cycle device with an ejector having a refrigerant decompression function and a refrigerant circulating function.

2. Description of the Related Art

A vapor-compression type refrigeration cycle device using an ejector is disclosed in JP-B1-3322263 (corresponding to U.S. Pat. No. 6,477,857 and U.S. Pat. No. 6,574,987). In JP-B1-3322263, the refrigeration cycle device includes a first evaporator disposed on a downstream side of a refrigerant flow of an ejector serving as a refrigerant decompression means and a refrigerant circulating means, and a vapor-liquid separator is located at a refrigerant outlet side of the first evaporator. Furthermore, a second evaporator is disposed between a liquid refrigerant outlet of the vapor-liquid separator and a refrigerant suction port of the ejector.

In the refrigeration cycle device disclosed in JP-B1-3322263, by using a decrease in pressure caused due to a high-speed flow of refrigerant when it is jetted from a nozzle part of the ejector, a vapor-phase refrigerant flowing from the second evaporator is drawn. In addition, a speed energy of the refrigerant in expending is converted to a pressure energy by a pressure increasing portion of the ejector to increase the refrigerant pressure, so that a driving force of a compressor can be decreased.

Furthermore, JP-B1-3322263 proposes a refrigerant cycle in which only one evaporator is located between the liquid refrigerant outlet of the vapor-liquid separator and the refrigerant suction port of the ejector. In addition, the refrigerant cycle is provided with an inner heat exchanger which performs a heat exchange between low-pressure vapor refrigerant flowing out of the vapor-liquid separator toward the compressor and high-pressure refrigerant at a refrigerant outlet side of a radiator. In this case, an enthalpy difference between the refrigerant inlet and outlet of the evaporator can be enlarged. However, when the inner heat exchanger is provided for enlarging the enthalpy difference, a superheat degree of refrigerant at the refrigerant suction side of the compressor is increased due to the heat exchange within the inner heat exchanger, thereby reducing the density of refrigerant drawn into the compressor. As a result, the flow rate (mass flow rate) of refrigerant discharged from the compressor may be reduced, and cooling capacity of the evaporator may be also reduced.

SUMMARY OF THE INVENTION

In view of the foregoing problems, it is an object of the present invention to provide a refrigerant cycle device which improves the cooling capacity of an evaporator without lowering a density of refrigerant drawn into a compressor.

According to an aspect of the present invention, a refrigerant cycle device includes: a compressor for drawing and compressing refrigerant; a condenser for cooling and condensing high-pressure refrigerant discharged from the compressor; a high-pressure side vapor-liquid separator located at a refrigerant outlet side of the condenser to separate refrigerant from the condenser into vapor refrigerant and liquid refrigerant; a supercooling device for supercooling the liquid refrigerant from the high-pressure side vapor-liquid separator; an ejector having a nozzle part for decompressing refrigerant from a portion downstream of the refrigerant outlet side of the condenser, a refrigerant suction port for drawing refrigerant by a high-velocity flow of refrigerant jetted from the nozzle part, and a pressure-increasing part for mixing the refrigerant jetted from the nozzle part and the refrigerant drawn from the refrigerant suction port and for pressurizing the refrigerant by reducing velocity of the refrigerant; a throttle member which decompresses the liquid refrigerant supercooled by the supercooling device; and an evaporator for evaporating refrigerant. Furthermore, the evaporator is located at a downstream side of the throttle member and is connected to the refrigerant suction port of the ejector.

Accordingly, after the supercooled liquid refrigerant from the supercooling device is decompressed in the throttle member, the decompressed refrigerant is evaporated in the evaporator. Therefore, the refrigerant can be evaporated in the evaporator at an evaporation pressure lower than a suction pressure of the compressor due to the pressure increasing effect of the ejector, so as to decrease the refrigerant evaporation temperature of the evaporator. Furthermore, an enthalpy difference between a refrigerant inlet and a refrigerant outlet of the evaporator can be enlarged due to the supercooling of refrigerant in the supercooling device. In this case, the cooling capacity of the evaporator can be increased without lowering the density of refrigerant sucked into the compressor.

For example, the refrigerant cycle device may be provided with plural evaporators. As an example, the evaporator is used as a first evaporator for evaporating refrigerant flowing from the throttle member, and a second evaporator may be located downstream from the ejector. In this case, the second evaporator has a refrigerant evaporation temperature that is higher than that of the first evaporator.

The ejector may be located such that the liquid refrigerant flowing out of the high-pressure side vapor-liquid separator is introduced to the nozzle part of the ejector. Alternatively, the ejector may be located such that the liquid refrigerant flowing out of the supercooling device is introduced to the nozzle part of the ejector. Alternatively, the ejector may be located such that refrigerant flowing out of the condenser is introduced to the nozzle part of the ejector.

According to another aspect of the present invention, a low-pressure side vapor-liquid separator may be further located in the refrigerant cycle device at a downstream side of the ejector. In this case, the low-pressure side vapor-liquid separator has a gas refrigerant outlet connected to a refrigerant suction port of the compressor. Furthermore, the low-pressure side vapor-liquid separator may have a liquid refrigerant outlet coupled to a refrigerant inlet of the evaporator, and a check valve may be located at a downstream side of the liquid refrigerant outlet of the low-pressure side vapor-liquid separator to only allow a refrigerant flow from the low-pressure side vapor-liquid separator to the evaporator. In this case, liquid refrigerant can be also introduced into the evaporator from the low-pressure side vapor-liquid separator, thereby further improving the cooling capacity of the evaporator.

According to a further another aspect of the present invention, the pressure-increasing part of the ejector has a refrigerant outlet connected directly to a refrigerant suction port of the compressor. Even in this case, it can prevent liquid refrigerant from flowing into the compressor by adjusting an open degree of the throttle member.

In any one of the above-described refrigerant cycle devices of the present invention, the ejector and the throttle member may be integrated to construct an integrated unit. Furthermore, the condenser, the high-pressure side vapor-liquid separator and the supercooling device may be integrated to construct an integrated unit.

BRIEF DESCRIPTION OF THE DRAWINGS

Additional objects and advantages of the present invention will be more readily apparent from the following detailed description of embodiments when taken together with the accompanying drawings. In the drawings.

DETAILED DESCRIPTION OF THE PREFERRED EMBODIMENTS

First Embodiment

Figure 1:
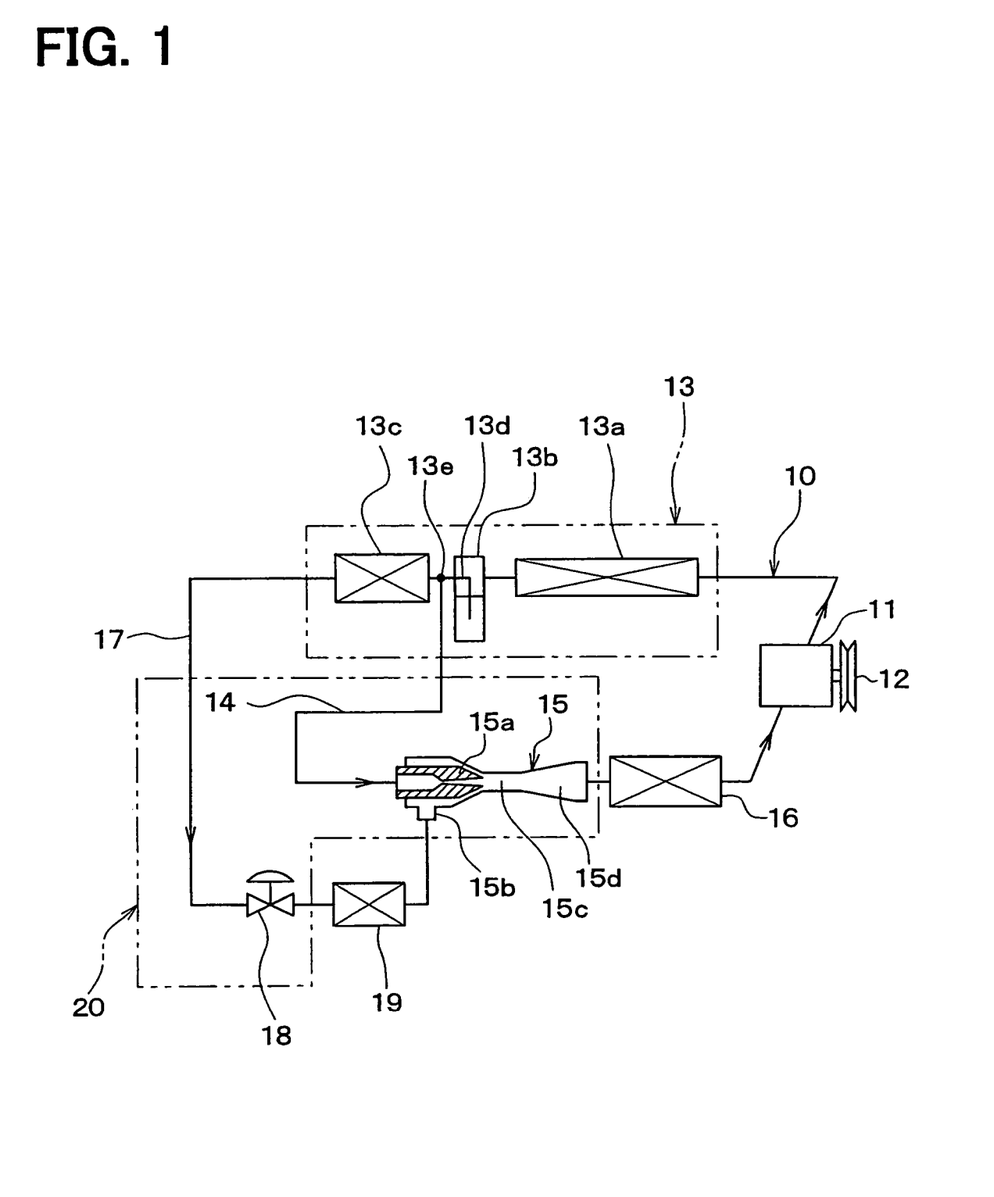
FIG. 1 is a schematic diagram showing a refrigerant cycle device with an ejector according to a first embodiment of the present invention.

FIG. 1 shows an example in which a refrigerant cycle device 10 according to the first embodiment of the invention is applied to a refrigeration system for a vehicle. In the refrigerant cycle device 10 of the embodiment, a compressor 11 for drawing and compressing refrigerant is rotatably driven by an engine for a traveling vehicle (not shown) via a pulley 12, a belt, or the like.

The compressor 11 may be either a variable displacement compressor capable of adjusting a refrigerant discharge capability by a change in discharge capacitance, or a fixed displacement compressor adapted to adjust a refrigerant discharge capability by changing an operating ratio of the compressor using disengagement of an electromagnetic clutch. For an electric compressor used as the compressor 11, a refrigerant discharge capability can be adjusted by regulation of the number of revolutions of an electric motor.

A supercooling device-integrated condenser 13 is disposed on a refrigerant discharge side of the compressor 11. The supercooling device-integrated condenser 13 is constructed of a condensing portion 13a (condenser), a vapor-liquid separator 13b, and a supercooling device 13c. The condensing portion 13a is adapted to cool and condense the high-pressure vapor-phase refrigerant discharged from the compressor 11 by using external air (air outside the interior of the vehicle) blown by a cooling fan (not shown).

The vapor-liquid separator 13b, which is connected to the outlet of the condensing portion 13a, is adapted to separate the refrigerant flowing from the outlet of the condensing portion 13a into liquid and vapor refrigerants, and to hold the liquid-phase refrigerant. This liquid-phase refrigerant, that is, the saturated liquid refrigerant flows out from the vapor-liquid separator 13b to the downstream side.

On a liquid-phase refrigerant outlet path 13d of the vapor-liquid separator 13b, a branch point 13e is provided. One of the refrigerant paths branched by this branch point 13e is connected to the supercooling device 13c. In the supercooling device 13c, the saturated liquid refrigerant flowing from the vapor-liquid separator 13b is further cooled to be supercooled by the external air (air outside the vehicle), which is blown by a cooling fan not shown.

In this embodiment, the condensing portion 13a, the vapor-liquid separator 13b and the supercooling device 13c are integrally formed as one assembly structure. This one assembly structure may employ a connection structure using mechanical connection means, such as a screw, or an integrated connection structure or the like using brazing. In particular, in the integrated connection structure with brazing, respective components of three components, namely, the condensing portion 13a, the vapor-liquid separator 13b and the supercooling device 13c can be integrally connected simultaneously to one another in a furnace for brazing, resulting in good productivity.

The other refrigerant path 14 branching from the above-mentioned branch point 13e is connected to the inlet of a nozzle 15a of an ejector 15. The ejector 15 serves as decompression means for decompressing the refrigerant, as well as refrigerant circulating means (kinetic momentum transport pump) for circulating the refrigerant by a suction capacity due to the refrigerant flow jetted at high speed.

The ejector 15 includes the nozzle 15a for decompressing and expanding a high-pressure refrigerant substantially isoentropically by reducing a path area of the high-pressure refrigerant flowing from the refrigerant path 14 to a small level, and a refrigerant suction port 15b provided in communication with a refrigerant jet port of the nozzle 15a for drawing the refrigerant (vapor-phase refrigerant) from an outlet of the second evaporator 19 as will be described later.

Furthermore, on the downstream side of the nozzle 15a and the refrigerant suction port 15b, a mixing part 15c is provided for mixing the high-speed refrigerant flowing from the nozzle 15a and the drawn refrigerant from the refrigerant suction port 15b. A diffuser 15d serving as a pressure-increasing part is disposed on the downstream side of the mixing part 15c. The diffuser 15d is formed in a shape that gradually enlarges the path area of the refrigerant, and performs a function of decelerating the refrigerant flow to increase the refrigerant pressure, that is, a function of converting speed energy of the refrigerant into pressure energy. A first evaporator 16 is connected to an outlet of the diffuser 15d of the ejector 15, and an outlet of the first evaporator 16 is coupled to a suction side of the compressor 11.

On the other hand, the downstream side of the supercooling device 13c is coupled to the refrigerant suction port 15b of the ejector 15 via the refrigerant path 17. A throttle mechanism 18 is provided in the refrigerant path 17, and the second evaporator 19 is disposed on a downstream side of the throttle mechanism 18.

The throttle mechanism 18 is a decompression means for decompressing refrigerant and for adjusting a flow rate of the refrigerant flowing into the second evaporator 19, and can be constructed of a fixed throttle, such as a capillary tube or an orifice, for example. Alternatively, the throttle mechanism 18 may be constructed of a variable throttle which changes a degree of opening of a path throttle (path area) according to the temperature and pressure of the refrigerant at the second evaporator 19. The variable throttle may be an electric control valve capable of adjusting the path throttle opening degree (valve opening degree) using an electric actuator.

The throttle mechanism 18 and the ejector 15 can be constructed integrally as one decompression module 20 which constitutes one assembly structure. The assembly structure of the decompression module 20 may also contain a connection structure using mechanical connection means, such as a screw or the like, or an integrated connection structure with brazing.

In the embodiment, the first evaporator 16 and the second evaporator 19 are adapted to cool respective individual spaces to be cooled. For example, the first evaporator 16 is used for cooling air blown by an electric blower (not shown) so as to cool the interior (e.g., passenger compartment) of the vehicle. The cooled air (cold air) is blown by the blower into the interior of the vehicle so as to cool the interior of the vehicle. On the other hand, the second evaporator 19 is used for cooling the inside of a vehicle-mounted refrigerator, for example. Thus, air within the refrigerator blown by an electric blower (not shown) is cooled by the second evaporator 19, and the cooled air is circulated again in the refrigerator thereby to cool the inside of the refrigerator.

It is noted that the first evaporator 16 and the second evaporator 19 may be combined into one cooling unit (a combined unit of the first and second evaporators 16 and 19), which may cool one common space to be cooled.

Now, an operation of the refrigerant cycle device according to the first embodiment will be described below in detail. When the compressor 11 is driven by a vehicle engine, the high-pressure and high-temperature vapor-phase refrigerant compressed and discharged by the compressor 11 first flows into a condensing portion 13a among the supercooling device-integrated condenser 13. The condensing portion 13a cools and condenses the high-temperature and high-pressure vapor-phase refrigerant by the external air (air outside the vehicle) blown by the cooling fan.

The refrigerant after passing through the condensing portion 13a flows into the vapor-liquid separator 13b. The vapor-liquid separator 13b separates the refrigerant condensed by the condensing portion 13a into vapor and liquid refrigerants. That is, using a difference in density between the vapor-phase refrigerant and the liquid-phase refrigerant, the refrigerant is separated into the vapor-phase refrigerant on the upper side of the inside space of the vapor-liquid separator 13b, and the liquid-phase refrigerant on the lower side of the inside space. An interface between the vapor and liquid refrigerants is formed within the inside space of the vapor-liquid separator 13b, so that the saturated vapor-phase refrigerant exists with the saturated liquid-phase refrigerant in the vapor-liquid separator 13b.

The vapor-liquid separator 13b is provided with a liquid-phase refrigerant outlet path 13d for taking out the saturated liquid-phase refrigerant. The liquid-phase refrigerant outlet path 13d is provided with the branch point 13e, which branches the flow of the saturated liquid-phase refrigerant into two refrigerant streams. One of the saturated liquid-phase refrigerant streams is introduced into the ejector 15 through the refrigerant path 14. The other of the saturated liquid-phase refrigerants flows into the supercooling device 13c to be supercooled. That is, in the supercooling device 13c, the saturated liquid-phase refrigerant flowing from the vapor-liquid separator 13b is further cooled to be supercooled by the external air (air outside the vehicle) blown by the cooling fan (not shown).

The refrigerant flowing into the ejector 15 is decompressed and expanded by the nozzle 15a. Thus, the pressure energy of the refrigerant is converted into the speed energy at the nozzle 15a. From a jet port of the nozzle 15a, the refrigerant is jetted at high speed. At this time, by the refrigerant suction capacity due to the high-speed jet flow from the jet port of the nozzle 15a, the refrigerant (vapor-phase refrigerant) after passing through the second evaporator 19 is drawn from the refrigerant suction port 15b therein.

The refrigerant jetted from the nozzle 15a and the refrigerant drawn into the refrigerant suction port 15b are mixed by the mixing part 15c on the downstream side of the nozzle 15a to flow into the diffuser 15d. In this diffuser 15d, the expansion of the refrigerant path area decelerates the refrigerant speed or velocity, resulting in an increase in pressure of the refrigerant.

On the other hand, the supercooled liquid-phase refrigerant after passing through the supercooling device 13c is decompressed by the throttle mechanism 18 in the refrigerant path 17 into the refrigerant in low-pressure vapor-liquid two phases. The refrigerant decompressed by the throttle mechanism 18 flows into the second evaporator 19. In the second evaporator 19, the refrigerant absorbs heat from air blown by the electric blower (not shown), and then evaporates. The vapor-phase refrigerant after passing the second evaporator 19 is drawn from the refrigerant suction port 15b into the ejector 15.

The low-pressure vapor-liquid two-phase refrigerant flowing out from the diffuser 15d of the ejector 15 flows into the first evaporator 16. In the first evaporator 16, the low-temperature and low-pressure refrigerant absorbs heat from the blown air by the electric blower (not shown), and then evaporates. The vapor-phase refrigerant after passing the first evaporator 16 is drawn into the compressor 11, and then compressed again.

As mentioned above, according to the embodiment, the refrigerant on the downstream side of the diffuser 15d of the ejector 15 can be supplied to the first evaporator 16, while the refrigerant on the refrigerant path 17 can be decompressed by the throttle mechanism 18 and supplied to the second evaporator 19. Thus, the first and second evaporators 16 and 19 can exhibit the cooling effects simultaneously.

At this time, the refrigerant evaporation pressure of the first evaporator 16 is a pressure after pressurization by the diffuser 15d, while the outlet side of the second evaporator 19 is connected to the refrigerant suction port 15b of the ejector 15. This can apply the lowest pressure directly after the decompression by the nozzle 15a to the second evaporator 19.

Thus, the refrigerant evaporation pressure (refrigerant evaporation temperature) of the second evaporator 19 can be made smaller than that of the first evaporator 16 by an amount corresponding to a pressurization effect by the diffuser 15d. In the embodiment, since the first evaporator 16 is used for cooling the interior (passenger compartment) of the vehicle, and the second evaporator 19 is used for cooling the vehicle-mounted refrigerator, the cooling temperature for the vehicle-mounted refrigerator can be made lower than that for the interior of the vehicle.

Accordingly, the cooling operation for the vehicle interior and the cooling operation for the refrigeration can simultaneously be performed in both high and low temperature ranges. At this time, because the suction pressure of the compressor 11 can be increased by the pressurization effect of the diffuser 15d of the ejector 15, the compression work by the compressor 11 can be decreased by the amount corresponding to the pressurization effect, thereby showing a power-saving effect. In addition, a flow rate of the refrigerant of the second evaporator 19 can be adjusted independently by the throttle mechanism 18, without depending on the function of the ejector 15.

Since the second evaporator 19 is arranged in parallel to the ejector 15, the refrigerant can be circulated in the second evaporator 19 using not only a refrigerant suction capability of the ejector 15, but also refrigerant suction and discharge capabilities of the compressor 11. Thus, even in a case where the input of the ejector 15 is small, the refrigerant flow rate of the second evaporator 19 and the refrigerating capacity of the second evaporator 19 can advantageously be ensured easily.

Furthermore, in the embodiment, the saturated liquid-phase refrigerant from the outlet of the vapor-phase separator 13b is supercooled by the supercooling device 13c, and the supercooled liquid-phase refrigerant flows into the second evaporator 19 after being decompressed by the throttle mechanism 18 on the refrigerant path 17. This can enlarge a difference in enthalpy between the inlet and the outlet of the second evaporator 19 by an amount corresponding to the supercooling by the supercooling device 13c, thereby improving the refrigerating capacity of the second evaporator 19.

Figure 8:
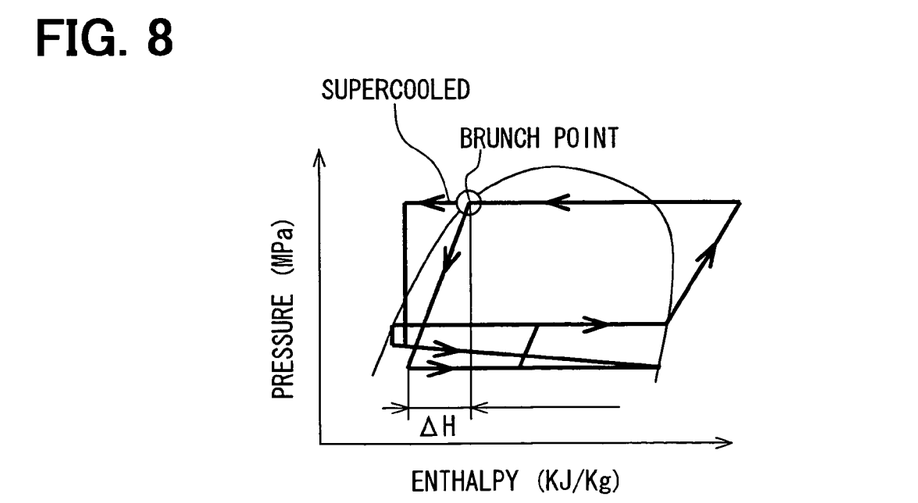
FIG. 8 is a Mollier diagram (p-h diagram) showing operation of the refrigerant cycle device of the present invention.

FIG. 8 is a p-h diagram (Mollier diagram) of the refrigerant cycle device 10. As shown in FIG. 8, an enthalpy difference $\Delta H$ is caused due to the supercooling device 13c so as to enlarge the enthalpy difference in the evaporator 19. That is, an expansion loss energy recovered by the ejector 15 can be increased so as to increase the performance of the refrigerant cycle device 10.

Since the supercooling device 13c is adapted to cool the high-pressure refrigerant by the external air, unlike a cycle structure using an inner heat exchanger, an increase in degree of superheat of the drawn refrigerant by the compressor, a decrease in density of the drawn refrigerant by the compressor, and a decrease in discharge flow rate by the compressor (in mass flow rate) may not cause. As a result, in this embodiment, the refrigerating capacity of the second evaporator 19 can be increased without causing a decrease in cycle efficiency (COP).

Since the saturated liquid-phase refrigerant is introduced from the vapor-liquid separator 13b into the ejector 15, the saturated liquid-phase refrigerant can flow constantly into the ejector 15, so that stable ejector performance can be obtained. Therefore, it can prevent the COP from being deteriorated due to vapor-liquid distribution difference.

Second Embodiment

A refrigerant cycle device 10 of the second embodiment will be now described with reference to FIG. 2.

In the above-described first embodiment, the branch point 13e is provided in the liquid-phase refrigerant outlet path 13d between the vapor-liquid separator 13b and the supercooling device 13c, and the saturated liquid-phase refrigerant flow is branched into the two streams at the branch point 13e, such that the saturated liquid-phase refrigerant flowing out of the vapor-liquid separator 13b flows into the ejector 15 via the refrigerant path 14. In the second embodiment, a branch point 21 is set in the refrigerant path 17 of the outlet side of the supercooling device 13c as shown in FIG. 2, and the supercooled liquid-phase refrigerant flows from the branch point 21 into the nozzle 15a of the ejector 15 via the refrigerant path 14.

According to the second embodiment, the liquid-phase refrigerant supercooled by the supercooling device 13c is decompressed by both the throttle mechanism 18 and the nozzle 15a of the ejector 15, and is evaporated by the first and second evaporators 16 and 19. In the embodiment, because the supercooled refrigerant is introduced into the nozzle 15a of the ejector 15, the difference in enthalpy between the inlet and the outlet of the first evaporator 16 can be also enlarged, and the refrigerating capacity of the first evaporator 16 can be further improved.

Figure 2:
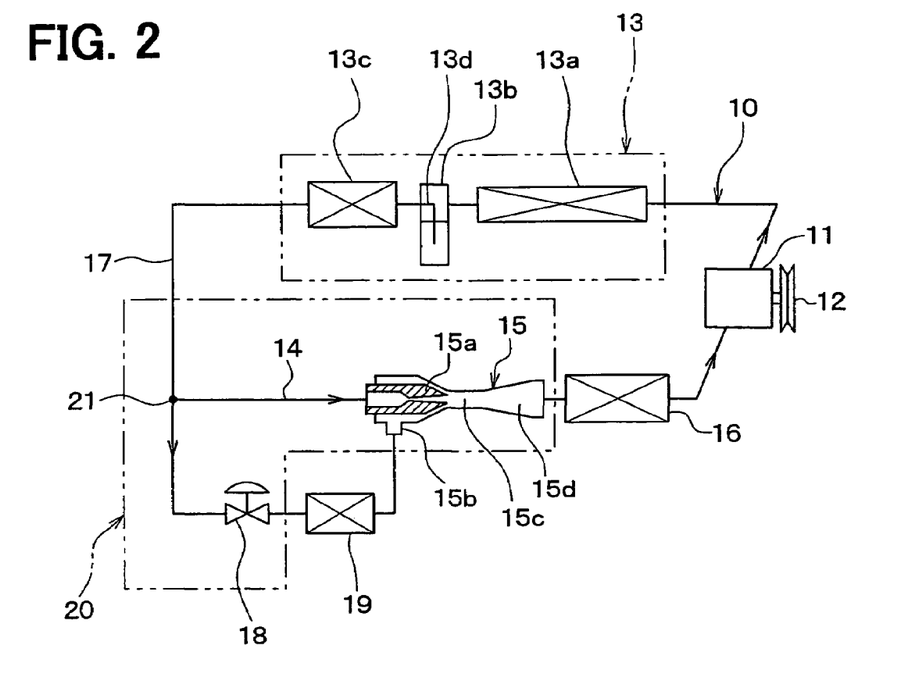
FIG. 2 is a schematic diagram showing a refrigerant cycle device with an ejector according to a second embodiment of the present invention.

In the second embodiment, the other parts of the refrigerant cycle device 10 of FIG. 2 can be made similarly to those of the refrigerant cycle device 10 of the above-described first embodiment.

Third Embodiment

Figure 3:
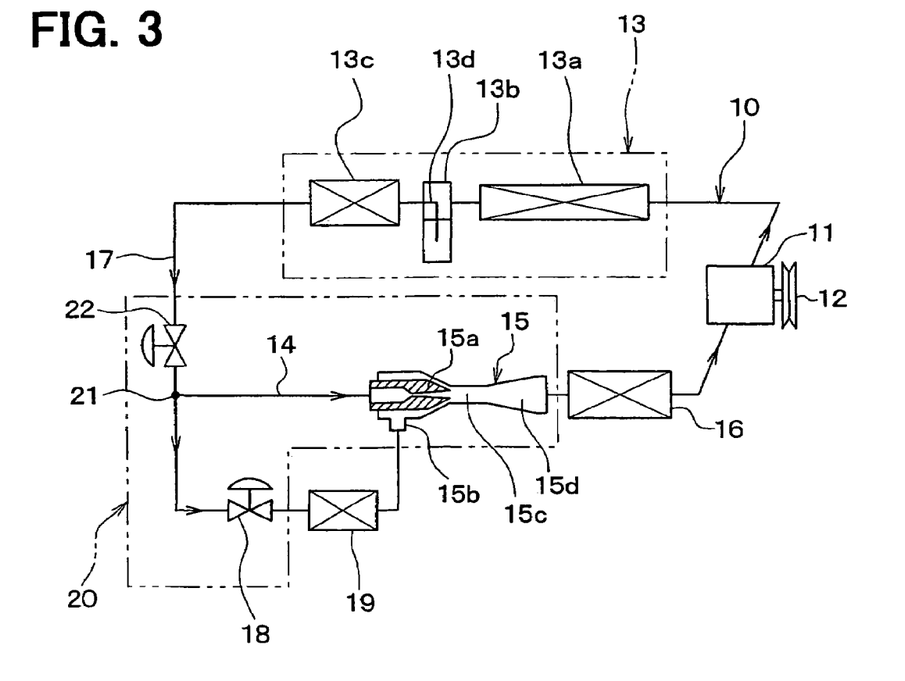
FIG. 3 is a schematic diagram showing a refrigerant cycle device with an ejector according to a third embodiment of the present invention.

FIG. 3 shows a refrigerant cycle device 10 of the third embodiment, in which a throttle mechanism 22 is added to the cycle structure of the second embodiment at an upstream side of the branch point 21 in the refrigerant path 17. As the throttle mechanism 22, either a fixed throttle or a variable throttle may be used. In the third embodiment, three of the throttle mechanism 18, the throttle mechanism 22 and the ejector 15 can be integrally formed as a decompression module 20.

When a thermal expansion valve or an electric expansion valve is used as an example of the throttle mechanism 22 to control the degree of superheat of the refrigerant at the outlet of the first evaporator 16 to a predetermined value, liquid refrigerant returning to the compressor 11 can be prevented reliably. In the third embodiment, the other parts can be made similarly to those of the above-described second embodiment.

Fourth Embodiment

Figure 4:
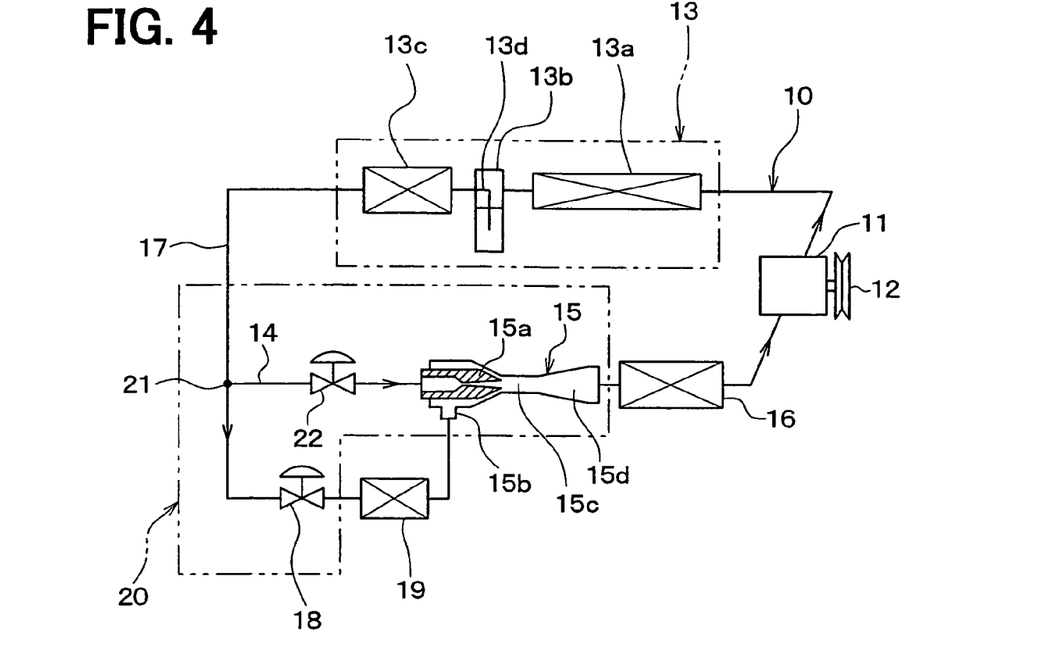
FIG. 4 is a schematic diagram showing a refrigerant cycle device with an ejector according to a fourth embodiment of the present invention.

FIG. 4 shows a refrigerant cycle device 10 of the fourth embodiment, in which a throttle mechanism 22 is disposed on the downstream side of the branch point 21 in the refrigerant path 14, as compared with the refrigerant cycle device shown in FIG. 3. That is, the throttle mechanism 21 is located in the refrigerant path 14 between the branch point 21 and the ejector 15.

In the fourth embodiment, when the thermal expansion valve or the electric expansion valve is used as an example of the throttle mechanism 22 to control the degree of superheat of the refrigerant at the outlet of the first evaporator 16 to a predetermined value, it can accurately prevent liquid refrigerant from returning to the compressor 11.

Fifth Embodiment

Figure 5:
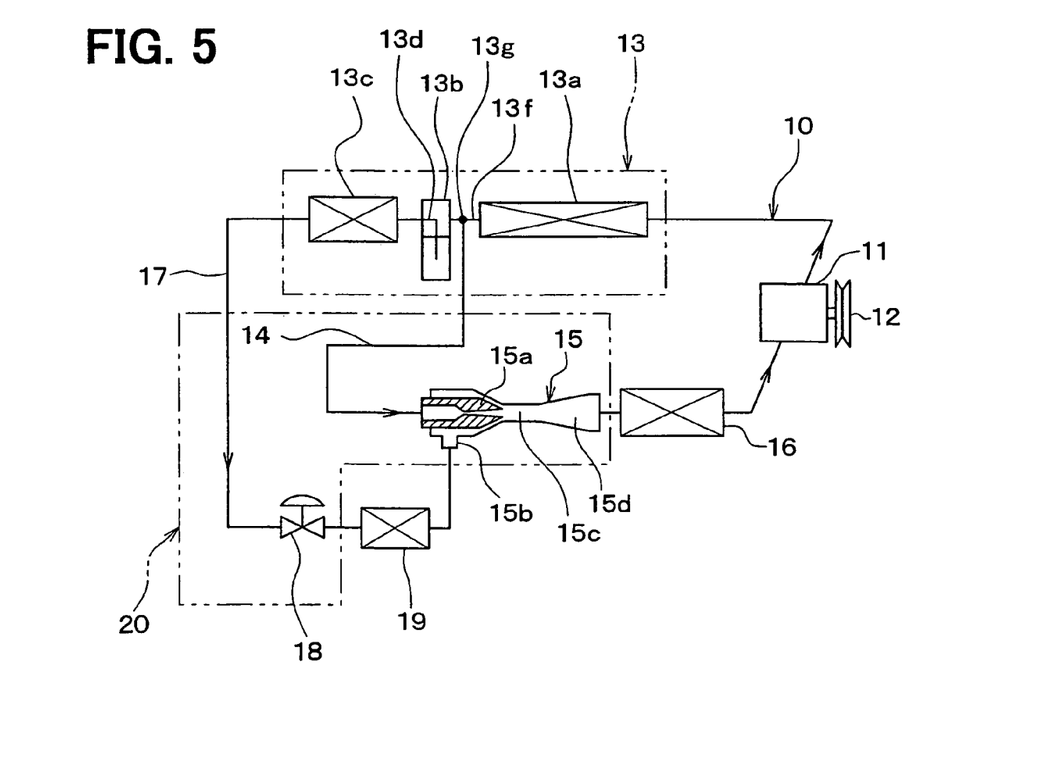
FIG. 5 is a schematic diagram showing a refrigerant cycle device with an ejector according to a fifth embodiment of the present invention.

FIG. 5 shows a refrigerant cycle device 10 of the fifth embodiment, in which a refrigerant path 14 on the upstream side of the nozzle 15a of the ejector 15 is connected to an outlet path (an inlet path part of the vapor-liquid separator 13b) 13f of the condensing portion 13a. Therefore, in the fifth embodiment, a branch point 13g is set in the outlet path 13f of the condensing portion 13a, and the refrigerant flow having passed through the outlet of the condensing portion 13a is branched into two streams. One of the branched streams flows into the vapor-liquid separator 13b, while the other flows into the ejector 15 via the refrigerant path 14. That is, the refrigerant path 14 is connected to a portion between the condensing portion 13a and the vapor-liquid separator 13b such that the refrigerant from the condensing portion 13a flows into the nozzle 15a of the ejector 15 via the refrigerant path 14.

The refrigerant at the outlet of the condensing portion 13a is sometimes in a vapor-liquid two-phase condition with some degree of dryness depending on a change in cycle operating condition. However, the refrigerant is overall in a vapor-liquid two-phase condition with a small degree of dryness near the saturated liquid-phase condition. Even in this case, the ejector performance in this embodiment is not degraded largely as compared with the first embodiment.

In the fifth embodiment, a throttle mechanism 22 may be provided in the refrigerant path 14 between the branch point 13g and the nozzle 15a of the ejector 15. In the fifth embodiment, the other parts can be made similar to those of the above-described first embodiment.

Sixth Embodiment

Figure 6:
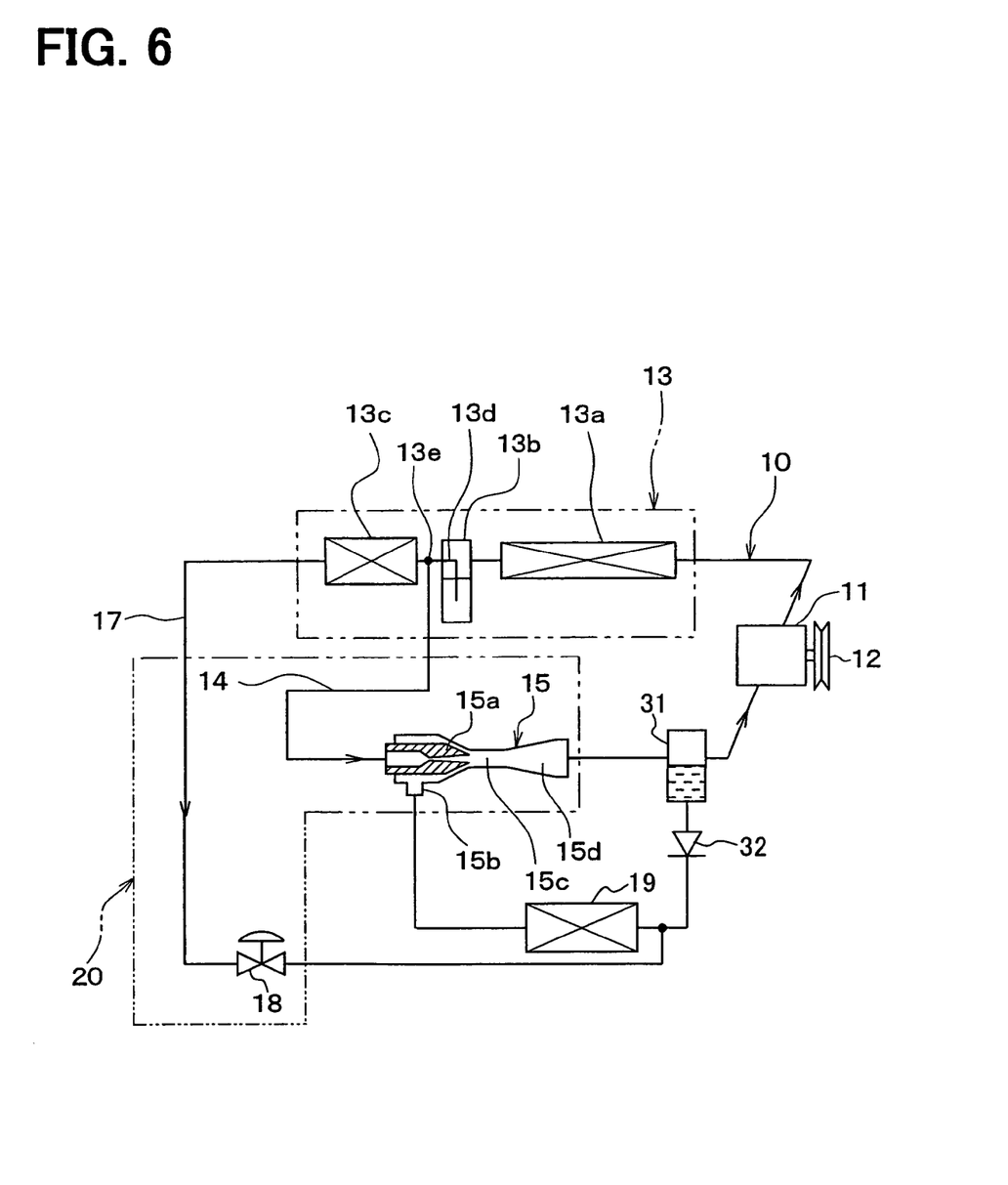
FIG. 6 is a schematic diagram showing a refrigerant cycle device with an ejector according to a sixth embodiment of the present invention.

FIG. 6 shows a refrigerant cycle device 10 according to the sixth embodiment of the present invention. The refrigerant cycle device 10 of this embodiment is provided with one evaporator 19 that is located in the refrigerant path 17 from the supercooling device 13c to the refrigerant suction port 15b. Furthermore, a vapor-liquid separator 31 is located at a downstream side of the diffuser 15d of the ejector 15 so that refrigerant flowing out of the ejector 15 flows into the vapor-liquid separator 31. The vapor-liquid separator 31 has a gas refrigerant outlet coupled to the refrigerant suction port of the compressor 11, and a liquid refrigerant outlet coupled to the refrigerant inlet side of the evaporator 19. A check valve 32 is provided such that liquid refrigerant from the vapor-liquid separator 31 only flows toward the evaporator 19.

When the compressor 11 is driven, high-pressure and high-temperature vapor-phase refrigerant compressed and discharged by the compressor 11 flows into the condensing portion 13a among the supercooling device-integrated condenser 13. The condensing portion 13a cools and condenses the high-temperature and high-pressure vapor-phase refrigerant by external air (air outside the vehicle) blown by the cooling fan.

The refrigerant after passing through the condensing portion 13a flows into the vapor-liquid separator 13b. The vapor-liquid separator 13b separates the refrigerant condensed by the condensing portion 13a into vapor and liquid refrigerants. That is, using a difference in density between the vapor-phase refrigerant and the liquid-phase refrigerant, the refrigerant is separated into the vapor-phase refrigerant on the upper side of the inside space of the vapor-liquid separator 13b, and the liquid-phase refrigerant on the lower side of the inside space.

Similarly to the first embodiment, the liquid-phase refrigerant outlet path 13d is provided with the branch point 13e, which branches the flow of the saturated liquid-phase refrigerant into two refrigerant streams. One of the saturated liquid-phase refrigerant streams is introduced into the ejector 15 through the refrigerant path 14. The other of the saturated liquid-phase refrigerant streams is introduced into the supercooling device 13c to be supercooled.

The refrigerant flowing into the ejector 15 is decompressed and expanded by the nozzle 15a. The refrigerant jetted from the nozzle 15a and the refrigerant drawn into the refrigerant suction port 15b are mixed by the mixing part 15c on the downstream side of the nozzle 15a to flow into the diffuser 15d. In this diffuser 15d, the expansion of the refrigerant path area decelerates the refrigerant speed or velocity, resulting in an increase in pressure of the refrigerant.

On the other hand, the supercooled liquid-phase refrigerant after passing through the supercooling device 13c is decompressed by the throttle mechanism 18 in the refrigerant path 17 into the refrigerant in low-pressure vapor-liquid two phases. The refrigerant decompressed by the throttle mechanism 18 flows into the evaporator 19. In addition, the liquid refrigerant from the vapor-liquid separator 31 can flow into the evaporator 19 through the check valve 32. Accordingly, cooling capacity of the evaporator 19 can be sufficiently increased using the refrigerant from the throttle mechanism 18 and the liquid refrigerant from the vapor-liquid separator 31.

The check valve 32 may be a variable valve which can adjust a passage open degree. In this case, the throttle mechanism 18 may be operatively linked with the check valve 32 in accordance with a superheat degree at the refrigerant outlet of the evaporator 19.

The refrigerant flowing out of the evaporator 19 is drawn into the ejector 15 through the suction port 15b and is mixed with the refrigerant jetted from the nozzle 15a in the mixing portion 15c. The refrigerant flowing out from the diffuser 15d of the ejector 15 flows into the vapor-liquid separator 31, and the vapor-phase refrigerant separated in the vapor-liquid separator 31 is drawn into the compressor 11, and then compressed again.

As mentioned above, according to the embodiment, the refrigerant on the refrigerant path 17 can be decompressed by the throttle mechanism 18 and supplied to the evaporator 19, while the liquid refrigerant in the vapor-liquid separator 31 can be introduced into the evaporator 19 by the ejector suction capacity. Thus, the evaporator 19 can exhibit the cooling effect regardless of the ejector suction capacity.

Furthermore, an expansion loss energy recovered by the ejector 15 can be increased so as to increase the performance of the refrigerant cycle device.

Because the saturated liquid-phase refrigerant is introduced from the vapor-phase separator 13b into the ejector 15, the saturated liquid-phase refrigerant can flow constantly into the ejector 15, so that stable ejector performance can be obtained. Therefore, the COP of the refrigerant cycle device can be effectively increased.

Seventh Embodiment

Figure 7:
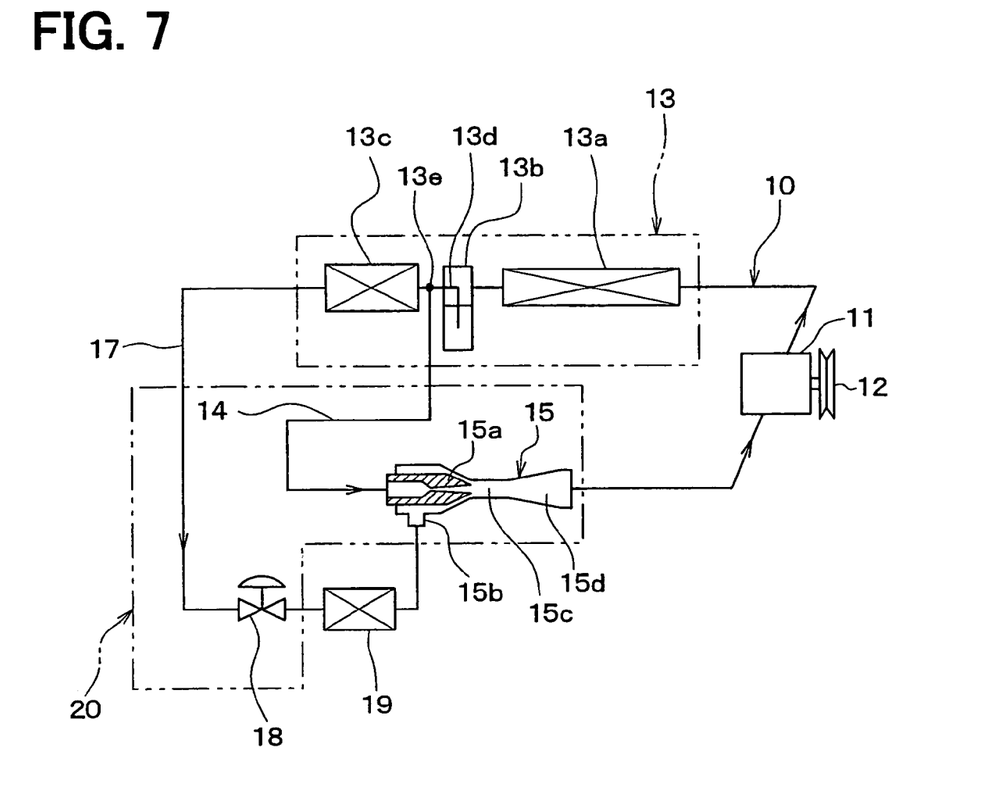
FIG. 7 is a schematic diagram showing a refrigerant cycle device with an ejector according to a seventh embodiment of the present invention.

FIG. 7 shows a refrigerant cycle device 10 according to the seventh embodiment of the present invention. In the refrigerant cycle device 10 of the seventh embodiment, the first evaporator 16 described in the first embodiment is disused, and only one evaporator 19 is located. In the seventh embodiment, the other parts can be made similarly to those of the above-described first embodiment. Even in this case, the cooling capacity of the evaporator 19 can be effectively increased regardless of the ejector capacity. In the refrigerant cycle device 10 of FIG. 7, the outlet of the ejector 15 is directly connected to the refrigerant suction port of the compressor 11. Even in this case, it can prevent liquid refrigerant from flowing into the compressor 11 from the ejector 15 by suitably adjusting the open degree of the throttle mechanism 18.

In the refrigerant cycle device 10 of FIG. 7, a low-pressure side vapor-liquid separator may be provided between the refrigerant outlet of the diffuser 15d of the ejector 15 and refrigerant suction port of the compressor 12.

Other Embodiments

The invention is not limited to the above-mentioned embodiments, and various modifications and variations can be made to the disclosed embodiments as follows.

(1) In the above-mentioned embodiments, the refrigerant cycle device is used for an air-cooled system in which refrigerant is cooled in the condensing portion 13a and the supercooling device 13c by outside air (fluid). However, the refrigerant cycle device may be used for a water-cooled system, in which water may be employed as the fluid. In this case, the condensing portion 13a and the supercooling device 13c are cooled by water such that the water to be supplied can be heated.

(2) As the refrigerant cooling system for the condensing portion 13a and the supercooling device 13c, an adsorption cooling system may be used. The adsorption cooling system is adapted to change a phase (evaporating or condensing) of a cooling medium, such as water, and can cool the condensing portion 13a and the supercooling device 13c using latent heat (evaporation latent heat) while changing the phase of the cooling medium.

(3) The above-described first to fifth embodiments are described to an example in which both the first evaporator 16 on the high temperature side, and the second evaporator 19 on the low temperature side are provided. However, in the first to fifth embodiments, similarly to the seventh embodiment, the invention may be applied to a cycle structure in which the first evaporator 16 is not provided, and only the second evaporator 19 of the low temperature side is provided. Furthermore, the first evaporator 16 on the high temperature side may be disposed not on the downstream side of the ejector 15, but in parallel to the ejector 15. In this case, a throttle means dedicated for the first evaporator 16 needs to be provided in addition to the ejector 15.

(4) Although the description of the above-mentioned first to fifth embodiments is directed to the example in which both the first evaporator 16 on the high temperature side and the second evaporator 19 on the low temperature side are provided, the invention may be applied to a cycle structure which is provided with a third evaporator for evaporating the refrigerant at the same evaporation temperature as that of the first evaporator 16 on the high temperature side, in addition to these evaporators 16 and 19.

(5) In the above-mentioned embodiments, the throttle mechanism 18 and the ejector 15 are incorporated integrally into an assembly structure as a decompression module 20, but the decompression module 20 may further be incorporated in the second evaporator 19 (evaporator 19). Furthermore, both the evaporators 16 and 19 may be incorporated integrally, and the decompression module 20 may further be incorporated into both the evaporators 16 and 19 incorporated.

(6) In the above-described first to fifth embodiments, an electric control valve, such as an electromagnetic valve for opening and closing a path, may be disposed on each of the refrigerant path 14 of the first evaporator 16 side and the refrigerant path 17 of the second evaporator 19 side, thereby freely selecting the refrigerant flow to the first evaporator 16, or that to the second evaporator 19.

When the throttle mechanism 18 for the refrigerant path 17 is constructed of the electric control valve, the throttle mechanism 18 itself can be used as and serve as valve means for opening and closing the path. Similarly, in the cycle structure of the fourth embodiment (FIG. 4), when the throttle mechanism 22 for the refrigerant path 14 is constructed of the electric control valve, the throttle mechanism 22 itself can be used as and serve as valve means for opening and closing the path.

(7) Although in the above-mentioned embodiments, as an example of the ejector 15, a fixed ejector having the fixed nozzle 15a with a constant path area is used, a variable ejector having a variable nozzle with an adjustable path area may be used as the ejector 15. More specifically, it should be noted that as the variable nozzle, a mechanism may be employed which is adapted to adjust the path area by inserting a needle into a path of the variable nozzle, and controlling the position of the needle by an electric actuator.

(8) In the sixth embodiment, the structure of the vapor-liquid separator 31 and the check valve 32 is used in the branch structure where the branch point is provided between the vapor-liquid separator 13b and the supercooling device 13c, for example, shown in FIG. 1. However, the structure of the vapor-liquid separator 31 and the check valve 32 may be used in the branch structure shown in any one of FIGS. 2-5. Furthermore, in the refrigerant cycle devices shown in FIGS. 2-5, the first evaporator 16 may be disused as in FIG. 7. In this case, the refrigerant outlet of the diffuser 15d of the ejector 15 may be directly coupled to the refrigerant suction port of the compressor 12, or a receiver for separating vapor and liquid refrigerants and for storing excess liquid refrigerant therein may be provided between the diffuser 15d of the ejector 15 and the refrigerant suction port of the compressor 11.

Furthermore, in the above-described embodiments, the condensing portion 13a, the vapor-liquid separator 13b and the supercooling device 13c may be constructed separately from each other. Similarly, the throttle mechanism 18 and the ejector 15 may be constructed separately from each other.

Such changes and modifications are to be understood as being within the scope of the present invention as defined by the appended claims.

What is claimed is:

1. A refrigerant cycle device comprising:
   a compressor for drawing and compressing refrigerant;
   a condenser for cooling and condensing high-pressure refrigerant discharged from the compressor;
   a high-pressure side vapor-liquid separator, located at a refrigerant outlet side of the condenser, for separating refrigerant from the condenser into vapor refrigerant and liquid refrigerant;
   a supercooling device for supercooling the liquid refrigerant from the high-pressure side vapor-liquid separator;
   an ejector having a nozzle part for decompressing refrigerant from a portion downstream of the refrigerant outlet side of the condenser, a refrigerant suction port for drawing refrigerant by a high-velocity flow of refrigerant jetted from the nozzle part, and a pressure-increasing part for mixing the refrigerant jetted from the nozzle part and the refrigerant drawn from the refrigerant suction port and for pressurizing the refrigerant by reducing velocity of the refrigerant;
   a throttle member which decompresses the liquid refrigerant supercooled by the supercooling device; and an evaporator for evaporating refrigerant, wherein the evaporator is located at a downstream side of the throttle member and is connected to the refrigerant suction port of the ejector.

2. The refrigerant cycle device according to claim 1, wherein the evaporator is used as a first evaporator for evaporating refrigerant flowing from the throttle member, the refrigerant cycle device further comprising a second evaporator located downstream from the ejector, wherein the second evaporator has a refrigerant evaporation temperature that is higher than that of the first evaporator.

3. The refrigerant cycle device according to claim 1, wherein the ejector is located such that the liquid refrigerant flowing out of the high-pressure side vapor-liquid separator is introduced to the nozzle part of the ejector.

4. The refrigerant cycle device according to claim 1, wherein the ejector is located such that the liquid refrigerant flowing out of the supercooling device is introduced to the nozzle part of the ejector.

5. The refrigerant cycle device according to claim 1, wherein the ejector is located such that refrigerant flowing out of the condenser is introduced to the nozzle part of the ejector.

6. The refrigerant cycle device according to claim 1, further comprising a low-pressure side vapor-liquid separator located at a downstream side of the ejector, wherein the low-pressure side vapor-liquid separator has a gas refrigerant outlet connected to a refrigerant suction port of the compressor.

7. The refrigerant cycle device according to claim 6, wherein the low-pressure side vapor-liquid separator has a liquid refrigerant outlet coupled to a refrigerant inlet of the evaporator.

8. The refrigerant cycle device according to claim 7, further comprising a check valve, located at a downstream side of the liquid refrigerant outlet of the low-pressure side vapor-liquid separator, for only allowing a refrigerant flow from the low-pressure side vapor-liquid separator to the evaporator.

9. The refrigerant cycle device according to claim 1, wherein the pressure-increasing part of the ejector has a refrigerant outlet connected directly to a refrigerant suction port of the compressor.

10. The refrigerant cycle device according to claim 1, wherein the ejector and the throttle member are integrated to construct an integrated unit.

11. The refrigerant cycle device according to claim 1, wherein the condenser, the high-pressure side vapor-liquid separator and the supercooling device are integrated to construct an integrated unit.

12. A refrigerant cycle device comprising:

a compressor for drawing and compressing refrigerant;

a condenser for cooling and condensing high-pressure refrigerant discharged from the compressor;

a first vapor-liquid separator, located at a refrigerant outlet side of the condenser, for separating refrigerant from the condenser into vapor refrigerant and liquid refrigerant;

a supercooling device for supercooling the liquid refrigerant from the high-pressure side vapor-liquid separator;

an ejector having a nozzle part for decompressing refrigerant from a portion downstream of the refrigerant outlet side of the condenser, and a refrigerant suction port for drawing refrigerant by a high-velocity flow of refrigerant jetted from the nozzle part;

a second vapor-liquid separator, located at a downstream side from the ejector, for separating refrigerant from the ejector into vapor refrigerant and liquid refrigerant;

a throttle member which decompresses the liquid refrigerant supercooled by the supercooling device; and an evaporator for evaporating refrigerant, wherein the evaporator is located at a downstream side of the throttle member and is connected to the refrigerant suction port of the ejector, wherein the second vapor-liquid separator has a vapor refrigerant outlet connected to a refrigerant suction port of the compressor, and a liquid refrigerant outlet connected to a refrigerant inlet side of the evaporator.

13. The refrigerant cycle device according to claim 12, further comprising a refrigerant path through which refrigerant is introduced into the nozzle part of the ejector, wherein the refrigerant path is branched from a position between the first vapor-liquid separator and the supercooling device.

14. The refrigerant cycle device according to claim 12, further comprising a refrigerant path through which refrigerant is introduced into the nozzle part of the ejector, wherein the refrigerant path is branched from a position between the condenser and the first vapor-liquid separator.

* * * * *